US011845460B2

(12) United States Patent
Oh et al.

(10) Patent No.: US 11,845,460 B2
(45) Date of Patent: Dec. 19, 2023

(54) APPARATUS AND METHOD OF VIRTUALIZING CHARACTERISTICS OF INTERNAL-COMBUSTION-ENGINE VEHICLE IN ELECTRIC VEHICLE

(71) Applicants: HYUNDAI MOTOR COMPANY, Seoul (KR); KIA MOTORS CORPORATION, Seoul (KR)

(72) Inventors: Ji Won Oh, Hwaseong-si (KR); Jong Kil Baek, Hwaseong-si (KR); Jin Sung Lee, Hwaseong-si (KR); Se Hoon Park, Hwaseong-si (KR); Jeong Soo Eo, Hwaseong-si (KR); Dong Chul Park, Anyang-si (KR); Tae Kun Yun, Anyang-si (KR); Dong Pil Yoon, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 177 days.

(21) Appl. No.: 17/182,980

(22) Filed: Feb. 23, 2021

(65) Prior Publication Data
US 2022/0089174 A1    Mar. 24, 2022

(30) Foreign Application Priority Data
Sep. 22, 2020    (KR) .................... 10-2020-0121972

(51) Int. Cl.
*B60W 50/14*    (2020.01)
*B60W 30/182*    (2020.01)
(Continued)

(52) U.S. Cl.
CPC ............. *B60W 50/14* (2013.01); *B60K 35/00* (2013.01); *B60W 30/182* (2013.01);
(Continued)

(58) Field of Classification Search
None
See application file for complete search history.

(56) References Cited

U.S. PATENT DOCUMENTS 10,625,671 B2 *   4/2020  Lee ........................... B60Q 9/00
11,554,677 B2 *   1/2023  Isami ...................... B60K 26/02
(Continued)

FOREIGN PATENT DOCUMENTS

CN          204037371 U  * 12/2014
CN          108267967 A  *  7/2018
(Continued)

*Primary Examiner* — Kevin R Steckbauer
(74) *Attorney, Agent, or Firm* — LEMPIA SUMMERFIELD KATZ LLC

(57) ABSTRACT

A method of virtualizing the characteristics of an internal-combustion-engine vehicle in an electric vehicle includes: receiving vehicle driving information of the electric vehicle at a controller, determining a current vehicle driving mode based on the input vehicle driving information by the controller, determining a virtual engine speed in the determined vehicle driving mode using the vehicle driving information by the controller, outputting a control signal for virtualizing characteristics of an internal-combustion-engine (ICE) driving system corresponding to a current vehicle driving mode based on the determined virtual engine speed by the controller, and virtualizing the characteristics of the ICE driving system corresponding to the current vehicle driving mode by controlling an operation of a virtualization device according to the output control signal by the controller.

18 Claims, 4 Drawing Sheets

(51) Int. Cl.
  *B60W 40/09* (2012.01)
  *B60K 35/00* (2006.01)
  *B60L 15/20* (2006.01)
  *B60W 50/16* (2020.01)

(52) U.S. Cl.
  CPC ....... *B60W 40/09* (2013.01); *B60K 2370/155* (2019.05); *B60K 2370/177* (2019.05); *B60L 15/20* (2013.01); *B60L 2240/423* (2013.01); *B60W 50/16* (2013.01); *B60W 2050/146* (2013.01); *B60W 2510/0241* (2013.01); *B60W 2510/0638* (2013.01); *B60W 2510/081* (2013.01); *B60W 2510/1005* (2013.01); *B60W 2540/10* (2013.01); *B60W 2540/12* (2013.01); *B60Y 2300/182* (2013.01)

(56) References Cited

U.S. PATENT DOCUMENTS

| | | | | |
|---|---|---|---|---|
| 11,654,777 | B2 * | 5/2023 | Nishimine | B60L 50/10 |
| | | | | 701/22 |
| 2018/0281619 | A1 * | 10/2018 | Suzuki | B60L 15/20 |
| 2019/0111839 | A1 * | 4/2019 | Lee | B60K 35/00 |
| 2021/0053487 | A1 * | 2/2021 | Vangelov | B60K 35/00 |
| 2021/0229550 | A1 * | 7/2021 | Isami | B60L 15/2054 |
| 2022/0041062 | A1 * | 2/2022 | Nishimine | B60K 26/02 |
| 2022/0041070 | A1 * | 2/2022 | Isami | B60K 20/00 |
| 2022/0089174 | A1 * | 3/2022 | Oh | B60W 30/182 |
| 2022/0169174 | A1 * | 6/2022 | Lee | B60Q 9/00 |
| 2022/0234498 | A1 * | 7/2022 | Maeda | B60Q 5/008 |

FOREIGN PATENT DOCUMENTS

| | | | | | |
|---|---|---|---|---|---|
| CN | 109177742 | A | * | 1/2019 | B60L 15/20 |
| CN | 109177742 | B | * | 6/2020 | B60L 15/20 |
| CN | 112406847 | A | * | 2/2021 | B60K 35/00 |
| CN | 113147419 | A | * | 7/2021 | B60K 26/02 |
| CN | 113771641 | A | * | 12/2021 | B60L 15/20 |
| CN | 114056117 | A | * | 2/2022 | B60K 23/02 |
| CN | 114056121 | A | * | 2/2022 | B60K 26/02 |
| CN | 114572109 | A | * | 6/2022 | B60Q 5/005 |
| DE | 102020121794 | A1 | * | 2/2021 | B60K 35/00 |
| DE | 102021201424 | A1 | * | 3/2022 | B60W 30/182 |
| DE | 102021209652 | A1 | * | 3/2023 | |
| EP | 3854626 | A1 | * | 7/2021 | B60K 26/02 |
| EP | 4008589 | A1 | * | 6/2022 | B60Q 5/005 |
| JP | 2022030862 | A | * | 2/2022 | B60K 23/02 |
| JP | 2022045880 | A | * | 3/2022 | B60L 15/20 |
| WO | WO-2021229656 | A1 | * | 11/2021 | B60Q 5/008 |

* cited by examiner

APPARATUS AND METHOD OF VIRTUALIZING CHARACTERISTICS OF INTERNAL-COMBUSTION-ENGINE VEHICLE IN ELECTRIC VEHICLE

CROSS-REFERENCE TO RELATED APPLICATION

This application claims priority to and the benefit of Korean Patent Application No. 10-2020-0121972, filed on Sep. 22, 2020, the entire contents of which are incorporated herein by reference.

FIELD

The present disclosure relates to an apparatus and method of virtualizing the characteristics of an internal-combustion-engine vehicle in an electric vehicle.

BACKGROUND

The statements in this section merely provide background information related to the present disclosure and may not constitute prior art.

As is known, an electric vehicle (EV) travels using a motor.

A driving system of an EV includes a battery for supplying power for driving a motor, an inverter connected to the battery for driving and controlling the motor, the motor connected to the battery to be charged and discharged through the inverter serving as a driving source of the vehicle, and a reducer for reducing the rotation power of the motor and transferring the reduced rotation power to a driving wheel.

Here, the inverter charges the battery by converting direct current (DC) supplied from the battery into alternating current (AC) and applying the AC to the motor through a power cable during driving of the motor, and converting AC generated by the motor operating as a generator into DC and supplying the DC to the battery during regeneration by the motor.

Unlike a conventional internal-combustion-engine vehicle, a general EV does not use a multi-step transmission, and instead, a reducer having a fixed gear ratio is disposed between a motor and a driving wheel.

This is because a motor has a relatively low efficiency difference with respect to an operating point and it is possible to form low speed and high torque using only the characteristics of the motor as a single supply, unlike an internal combustion engine (ICE), which provides high torque only in a region that has a wide distribution range of energy efficiency and has high speed depending on an operating point.

A conventional vehicle having an ICE driving system installed therein desires a launching device such as a torque converter or a clutch due to the characteristics of the ICE, which is not capable of being driven at low speed, but a launching device may be omitted from a driving system of an EV due to the characteristic whereby a motor is capable of being easily driven at low speed.

Due to this mechanical difference, an EV may provide seamless and smooth driving characteristics from the aspect of gear shifting unlike an internal-combustion-engine vehicle.

However, we have discovered that a driver who is interested in driving may be bored due to the absence of an ICE, a transmission, a clutch, or the like.

It is desirable to differentiate an EV by providing a function for virtualizing the driving characteristics of an internal-combustion-engine vehicle so as to enable a driver to experience a desired sensation in the same vehicle without changing a vehicle.

SUMMARY

In one form, the present disclosure provides a method of virtualizing the characteristics of a driving system of an internal combustion engine to allow a driver to experience driving sensation and interest, excitement, a feeling of direct connection, and the like, as provided by an internal combustion engine, a transmission, a clutch, or the like, in an electric vehicle.

In another form, the present disclosure provides a method for allowing the driver to experience driving characteristics of an internal-combustion-engine vehicle in his or her vehicle without changing a vehicle.

In one form, a method of virtualization of characteristics of an internal-combustion-engine vehicle in an electric vehicle includes inputting vehicle driving information of the electric vehicle to a controller, determining a current vehicle driving mode based on the input vehicle driving information by the controller, determining a virtual engine speed in the determined vehicle driving mode using the vehicle driving information by the controller, outputting a control signal for virtualizing characteristics of an internal-combustion-engine (ICE) driving system corresponding to a current vehicle driving mode based on the determined virtual engine speed by the controller, and virtualizing the characteristics of the ICE driving system corresponding to the current vehicle driving mode by controlling an operation of a virtualization device according to the output control signal by the controller.

In another form, an apparatus for virtualizing characteristics of an internal-combustion-engine vehicle in an electric vehicle includes a driving information detector configured to detect vehicle driving information in the electric vehicle, a controller configured to input the vehicle driving information detected by the driving information detector, to determine a current vehicle driving mode based on the input vehicle driving information, to determine a virtual engine speed in the determined vehicle driving mode, and to output a control signal for virtualizing characteristics of an internal-combustion-engine (ICE) driving system corresponding to a current vehicle driving mode based on the determined virtual engine speed, and a virtualization device configured to virtualize the characteristics of the ICE driving system corresponding to the current vehicle driving mode by controlling an operation of a virtualization device according to the control signal output by the controller.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

Figure 1:
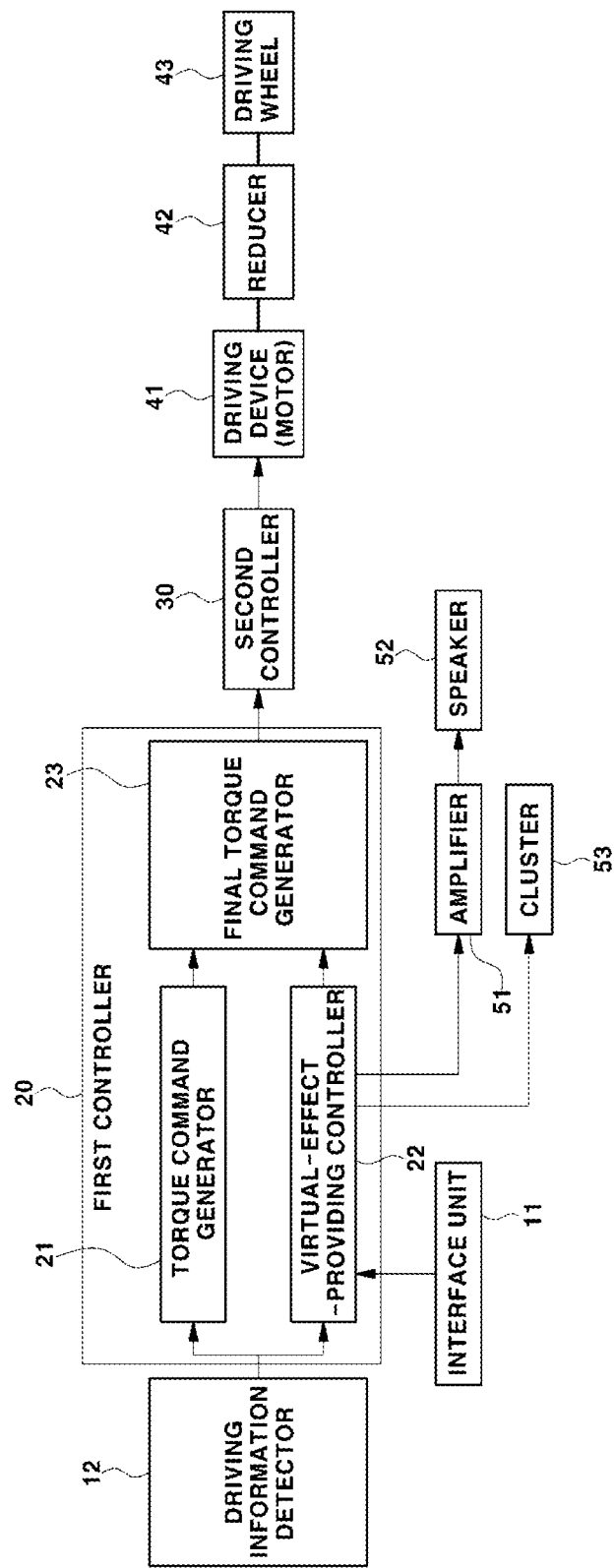
FIG. 1 is a block diagram showing one form of a configuration of an apparatus for virtualizing the characteristics of an internal-combustion-engine (ICE) vehicle.

The following description is merely exemplary in nature and is not intended to limit the present disclosure, application, or uses. It should be understood that throughout the drawings, corresponding reference numerals indicate like or corresponding parts and features.

Various forms of the present disclosure are described in detail with reference to the accompanying drawings so that those of ordinary skill in the art may easily implement the invention. However, the present disclosure may be implemented in various different forms, and is not limited to these forms.

Throughout the specification, unless specified otherwise, when a part is recited as "comprise" a component, this indicates that the part may include other unrecited additional components rather than excluding them.

The present disclosure may provide a method of virtualizing the characteristics of an internal-combustion-engine (ICE) driving system to experience driving sensation and interest, excitement, a feeling of direct connection, or the like, provided by the ICE driving system including, for example, an ICE, a transmission, or a clutch.

The present disclosure may provide a method of allowing a driver to virtually experience driving characteristics of an ICE vehicle in his or her vehicle without changing the vehicle.

To this end, the present disclosure provides an apparatus and method of controlling a motor for virtualizing an ICE driving system model configured by mimicking an ICE, a transmission, a clutch, or the like, and driving characteristics in an ICE vehicle using the model, and an apparatus and method of displaying visual information and realizing an acoustic effect in conjunction with the apparatus and method of controlling the motor.

In particular, according to the present disclosure, a virtual parameter of a driving system may be calculated based on an ICE driving system model and then a motor torque command for providing a virtual driving effect based on the calculated virtual parameter of the driving system, and display of virtual information and realization of an acoustic effect may be simultaneously performed in conjunction with the motor torque command.

Here, the motor may be a driving motor for driving a vehicle, and in the following description, it would be understood by one of ordinary skill in the art that the motor refers to a driving motor unless otherwise defined.

In the following description, an ICE and an engine have the same meaning, which would be easily understood by one of ordinary skill in the art.

According to the present disclosure, an operating effect of an engine, a transmission, and a clutch may be generated in order to provide the emotional and driving characteristics of an ICE (engine) vehicle to a driver, in which case the procedure of generating a virtual operating effect includes a procedure of generating vibration, acoustic, and visual effects in sync with a virtual operating effect, and a procedure of forming a virtual gear-shift effect in a driving mode.

In the present disclosure, the virtual parameter of the driving system may representatively include virtual engine speed and a number of virtual gear stages.

According to the present disclosure, the virtual parameter of the driving system may be independently set from a physical state parameter of an actual electric-vehicle (EV) driving system and may be set based on the state of the ICE driving system model including the virtual engine and transmission.

The virtual parameter of the driving system may be a virtual value in an EV to which the present disclosure is applied, and according to the present disclosure, information on the virtual parameter of the driving system may be visually displayed to a driver, may be provided to allow the driver to listen to the information through the acoustic effect, and may be provided to allow the driver to feel the information through vibration.

FIG. 1 is a block diagram showing the configuration of an apparatus for virtualizing the characteristics of an internal-combustion-engine (ICE) vehicle according to the present disclosure.

An apparatus and method of virtualizing the characteristics of an ICE vehicle according to the present disclosure may correspond to an apparatus and method of virtualizing an operating effect and a driving effect of an internal-combustion-engine vehicle in an EV.

The apparatus and method of virtualizing the characteristics of an ICE vehicle according to the present disclosure may include an apparatus and method of generating and forming the same virtual gear-shift effect as in a vehicle having a multi-step transmission installed therein in an EV.

The configuration of an apparatus for virtualizing the characteristics of an ICE vehicle according to the present disclosure will now be described. As shown in FIG. 1, the apparatus for virtualizing the characteristics of the ICE vehicle may include a driving information detector 12 for detecting vehicle driving information, a first controller 20 for generating and outputting a torque command based on the vehicle driving information detected by the driving information detector 12, and a second controller 30 for controlling the operation of a driving device 41 according to a torque command output by the first controller 20.

In the following description, a control subject is classified into the first controller 20 and the second controller 30, but a plurality of controllers or one integrated control element is collectively referred to as a controller, and it would be understood that the controller performs the procedure of virtualizing the characteristics of an ICE vehicle according to the present disclosure.

The apparatus for virtualizing the characteristics of an ICE vehicle may further include an interface unit 11 for selecting and inputting one of on and off of a virtualization function including a virtual gear-shift effect by a driver.

According to the present disclosure, the interface unit 11 may use any device for turning on and off the virtualization function in a vehicle by a driver, and may be, for example, a manipulation device such as a button or a switch included in a vehicle, or an input device or touchscreen of an audio, video, and navigation (ANV) system.

The interface unit 11 may be connected to the first controller 20, and thus in response to on or off manipulation by the driver, an on manipulation signal or an off manipulation signal may be input to the first controller 20 through the interface unit 11.

Accordingly, the first controller 20 may recognize on and off manipulation states of the virtualization function by the driver.

According to the present disclosure, the virtualization function including a function of forming a virtual gear-shift effect may be executed only when the driver inputs on of the virtualization function through the interface unit 11.

When the interface unit 11 is a vehicle input device included in a vehicle, on and off manipulation of the virtualization function may also be performed through a mobile device (not shown), instead of the input device for the vehicle, although this is not shown in FIG. 1.

The mobile device needs to be connected to an in-vehicle device, for example, a first controller to communicate therewith, and to this end, an input and output communication interface (not shown) may be used for communication and connection between the mobile device and the first controller 20.

The driving information detector 12 may be a component for detecting vehicle driving information desired to generate a motor torque command by a vehicle, in which case the vehicle driving information includes driving input information of the driver and vehicle state information.

According to one form of the present disclosure, the driving information detector 12 may include an accelerator pedal detector, for detecting accelerator pedal input information according to manipulation of an accelerator pedal by a driver, and a brake pedal detector, for detecting brake pedal input information according to manipulation of a brake pedal by the driver.

Here, the accelerator pedal detector may be a general accelerator position sensor (APS) installed in an accelerator pedal for outputting an electrical signal according to a state of accelerator pedal manipulation by a driver.

The brake pedal detector may be a general brake pedal sensor (BPS) installed in a brake pedal for outputting an electrical signal according to a state of brake pedal manipulation by the driver.

In addition, the driving information detector 12 may further include a motor speed detector for detection of rotation speed (hereinafter referred to as 'motor speed') of a motor, which is the driving device 41 for driving the vehicle.

The motor speed detector may be a known resolver installed in a motor (driving motor) 41.

In this case, the driving input information of the driver may include an accelerator pedal input value (APS value) detected by an accelerator pedal detector and a brake pedal input value (BPS value) detected by a brake pedal detector.

The vehicle state information may include a motor speed detected by the motor speed detector.

Driving information used to generate a basic torque command by a torque command generator 21 may further include a vehicle speed, which is vehicle state information, and in this case, the driving information detector 12 may further include a vehicle speed detector for detecting the current driving speed, although this is not shown in the drawing, and the vehicle speed detector may include a wheel speed sensor installed in a driving wheel of the vehicle.

The first controller 20 may include the torque command generator 21 for generating a basic torque command from the vehicle driving information, a virtual-effect-providing controller 22 for generating a correction torque command (an intervention torque command for realizing a virtual effect) for generating and forming a virtual gear-shift effect or vibration from the vehicle driving information, and a final torque command generator 23 for correcting the basic torque command to a correction torque command and generating the corrected final torque command.

The basic torque command may be a motor torque command that is determined and generated based on driving information collected while a general electric vehicle (EV) travels, and the torque command generator 21 may be a vehicle control unit (VCU) or a portion thereof for generating the motor torque command based on driving information in the general EV.

According to the present disclosure, the virtual-effect-providing controller 22 may be a new component for determining, generating, and outputting an intervention torque command for realizing a virtual effect, which is a correction torque command for forming a virtual gear-shift effect or vibration, separately from the basic torque command, and may be added as a part in a vehicle controller or may be configured as a separate control component from the vehicle controller.

The final torque command generator 23 may correct the basic torque command input from the torque command generator 21 based on the correction torque command input from the virtual-effect-providing controller 22, and in this case, may calculate the final torque command by adding the intervention torque command for realizing a virtual effect, which is a correction torque command, to the basic torque command.

The second controller 30 may be a controller for receiving the torque command transmitted from the first controller 20, that is, the final torque command determined by the final torque command generator 23 of the first controller 20 and controlling the operation of the driving device 41.

According to the present disclosure, the driving device 41 may be a motor (driving motor) for driving a vehicle, and the second controller 30 may be a known motor control unit (MCU) for driving the motor and controlling the operation of the motor through the inverter in a general EV.

The virtualization apparatus according to the present disclosure may further include a display device for displaying real-time virtual engine speed and a number of virtual gear stages determined by the virtual-effect-providing controller 22, and a sound device for providing an acoustic effect corresponding to the virtual engine speed value determined by the virtual-effect-providing controller 22.

Here, the display device may be included in a vehicle and may allow a driver to visually check real-time information related to virtualization of the characteristics of an ICE vehicle and may be any device for displaying information, for example, a cluster 53.

The sound device may be included in the vehicle to realize an acoustic effect in sync with real-time virtual engine speed information, and may include an amplifier 51 and a speaker 52 for outputting and reproducing the acoustic effect.

A method of virtualizing the characteristics of an ICE vehicle performed by the apparatus of FIG. 1 will be described below.

According to the present disclosure, the feeling of an ICE driving system of an electric vehicle (EV) may be formed by forming the virtual vibration and gear shift effect based on a virtual parameter of a driving system, displaying the virtual engine speed and a number of virtual gear stages in real time through the display device, and realizing an acoustic effect in sync with the virtual engine speed.

Here, the virtual parameter of the driving system may be a virtual parameter that is virtually set based on the ICE driving system model and is used to virtualize the characteristics of the ICE vehicle, and may be differentiated from an actual input parameter such as vehicle driving information (which is information detected through a sensor or determined in an internal control procedure) such as driver input information or driving state information in an EV.

According to the present disclosure, virtual vibration and generation of a gear shift effect, display of visual information, and generation of an acoustic effect may be visually synchronized with each other, which may be performed based on virtual parameter such as a virtual engine speed and a number of virtual gear stages.

For example, according to a reduction width and a reduction time point when a virtual engine speed value is reduced, a reduced virtual engine speed value may be displayed as visual information on a tachometer of the cluster 53, an acoustic effect for reducing the pitch (high and low of an effect sound) of an effect sound may be acoustically realized, and a vibration effect may also be realized through a motor torque command to be synchronized therewith.

That is, three elements including generation of vibration (which includes generation of a gear shift effect), display of visual information, and generation of an acoustic effect may be performed together using a virtual parameter of a driving system, such as a virtual engine speed and a number of virtual gear stages, as a cue.

According to the present disclosure, the virtual parameter may not be dependent upon a physical engine speed and motor speed, wheel speed, and gear stage of a transmission in which a gear ratio is actually changed, but may be merely a parameter that is used to realize the emotional impact of the ICE driving system.

For example, although a mechanism for changing gears is not present in an EV, according to the present disclosure, a number of virtual gear stages, which is one of the virtual parameters, may be acquired from the vehicle driving information, such as driver input information and driving state information, and may be displayed on the cluster 53.

Although an engine is not present in an EV, according to the present disclosure, a virtual engine speed value that changes independently from a motor speed may be calculated and displayed on the cluster 53.

According to the present disclosure, an effect sound may be realized based on a virtual engine value that changes independently from a motor speed or a wheel speed in an EV rather than realizing an effect sound corresponding to the amplitude of the motor speed or the wheel speed.

Hereinafter, various forms of realizing a vibration effect, a visual effect (display of visual information), and an acoustic effect using a virtual parameter of a driving system will be described.

The following virtualization function may be executed in the state in which an on-signal of the virtualization function is input through the interface unit 11 in the key-on/start-button-on state of the vehicle.

The virtualization function of the EV to which the present disclosure is applied may be a function of virtualizing the characteristics of an ICE driving system corresponding to the current vehicle driving mode based on vehicle driving information and may be executed by controlling an operation of a virtualization device according to a control signal of a controller, in which case the virtualization device may include at least one of a motor as the driving device 41 of a vehicle, the cluster 53 as a display device, or the amplifier 51 and speaker 52.

Here, the current vehicle driving mode may include at least one of an idle mode, a throttling mode, a launching mode, or a driving mode, and one of modes for virtualizing the vehicle driving mode, that is, the following virtual idle mode, a virtual throttling mode, a launching mode, and a driving mode.

Virtual Idle Mode

A method of virtualizing the characteristics of an internal-combustion-engine (ICE) vehicle according to the present disclosure may include an operation of realizing vibration, a visual effect, and an acoustic effect by changing the speed of a virtual engine in the state in which the vehicle is stopped.

The operation of realizing vibration, a visual effect, and an acoustic effect by changing the speed of a virtual engine in the state in which the vehicle is stopped may include an operation of forming a virtual idle sensation and an operation of forming a virtual throttling sensation.

Figure 2:
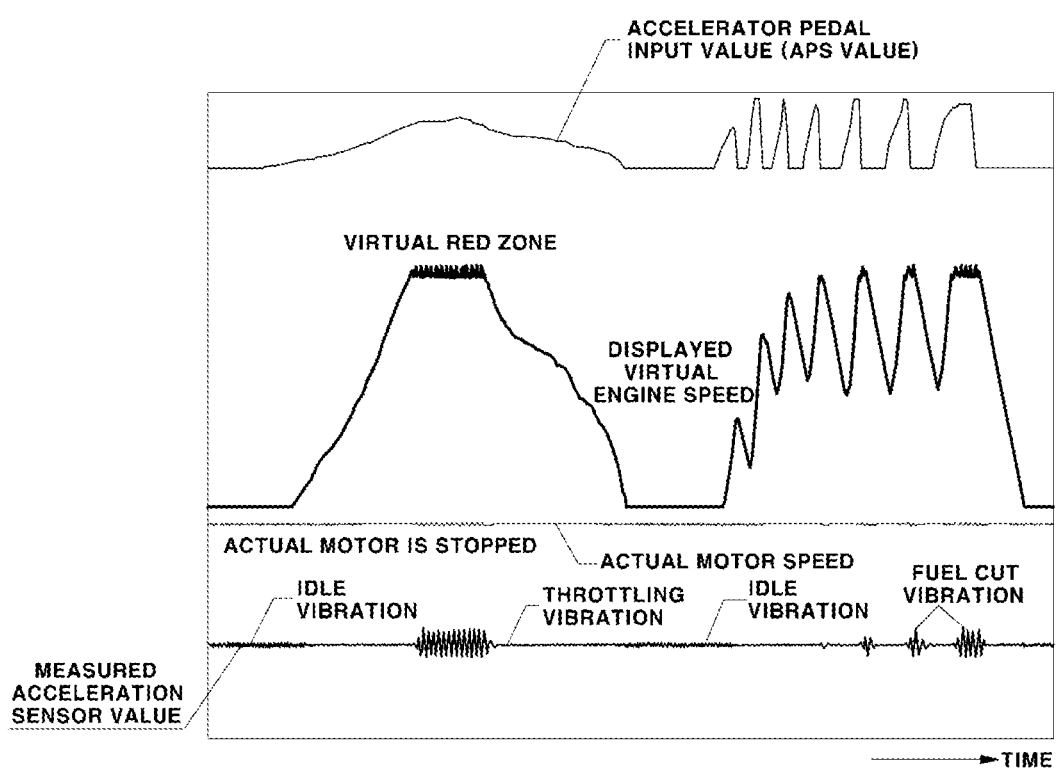
FIG. 2 is a diagram speed of a virtual engine and a vibration-realizing state when a virtual idle mode and a virtual throttling mode are executed in the state in which the vehicle is stopped.

FIG. 2 is a diagram speed of a virtual engine and a vibration-realizing state when a virtual idle mode and a virtual throttling mode are executed in the state in which the vehicle is stopped according to one form of the present disclosure.

The virtual idle mode and the throttling mode may be modes in which a virtual effect is realized in the state in which the vehicle is stopped by assuming that a transmission is in neutral (N).

First, according to one form of the present disclosure, vibration, a visual effect, and an acoustic effect may be achieved by mimicking an engine idle state in an internal-combustion-engine vehicle in order to virtualize an engine-idling sensation in the state in which the vehicle is stopped, and to this end, a virtual idle speed value may be preset in the virtual-effect-providing controller 22.

The virtual idle speed may be a virtual engine speed for virtualization of the feeling of the engine idle state (idling), and may correspond to an engine idle speed in a vehicle including an engine installed therein.

The virtual idle speed may be a virtual engine speed in the virtual idle state configured by mimicking the engine idle state to an electric vehicle without an engine is copied and may be the lowest value by which a driver experiences the virtual idle sensation at the virtual engine speed.

According to the present disclosure, the feeling of an engine maintained in an idle state in a general internal-combustion-engine vehicle may be virtualized in an electric vehicle, and according to the present disclosure, the virtual idle state may be a virtual engine driving state obtained by mimicking the aforementioned engine idle state to an electric vehicle.

According to one form of the present disclosure, the sensation when a vehicle is maintained in the engine idle state when stopped may be virtually formed, and the situation in which the engine speed increases to the idle speed from 0 when a key-on/start-button-on signal of a vehicle and an on-signal of the virtualization function are input may be virtually formed.

To this end, a virtual engine speed profile in which the virtual engine speed increases up to the virtual idle speed from 0 when a key-on/start-button-on signal and an on-signal of the virtualization function are input may be preset in the virtual-effect-providing controller 22.

Thus, an engine speed change in the state in which a vehicle is turned on may be virtually formed, and a virtual engine speed profile of a situation of overshooting the virtual idle speed may be additionally set in the virtual-effect-providing controller 22 in order to more realistically realize the situation in which the vehicle is turned on.

According to the present disclosure, a virtual engine speed profile for realizing a virtual situation in which a vehicle is turned on may be defined as a continuous speed change value over time, and a speed change value that increases up to a virtual idle speed from 0 and a speed change value corresponding to an overshoot situation may be set according to time.

As such, when a virtual engine speed value in the situation in which the vehicle is turned on is determined as a value that follows a preset speed profile, the virtual-effect-providing controller 22 may control an operation of a display device of the vehicle, that is, a tachometer of the cluster 53 to visually display a change in the virtual engine speed value according to time.

In this case, the motor, which is the driving device 41 of the vehicle, may be controlled in the state in which the vehicle is not capable of being driven to maintain the motor speed as speed in the state in which the vehicle is stopped.

However, a virtual vibration effect obtained by realizing the vibration in an engine idle state may be performed to display a virtual engine speed and to simultaneously provide a virtual idle sensation.

In this case, a vibration effect obtained by mimicking an actual engine idle mode may be virtualized through vibration of the motor, in which case the virtual-effect-providing controller 22 may apply vibration torque of a predetermined vibration frequency to a motor 41.

That is, the virtual-effect-providing controller 22 may generate a motor torque command for generating vibration by the motor 41 in order to virtualize a vibration effect in an idle mode, may control an operation of the motor 41 according to the generated motor torque command, and may generate vibration of the motor by realizing the vibration of the engine in the engine idle state of the internal-combustion-engine vehicle.

Here, the vibration torque command, that is, the motor torque command for generating vibration may be an intervention torque command for realizing a virtual effect, in which case the basic torque command may be 0.

This may also be applied to the following case in which a clutch slips in the throttling mode and the launching mode in the same way.

In this case, the motor may be vibrated by alternately outputting forward torque and backward torque having a small amplitude at a predetermined period and frequency, and may be a motor control state in which the state in which the vehicle is stopped is maintained but vibration at a level similar to the engine idle state is generated by a vehicle.

According to one form of the present disclosure, when the motor torque command for generating vibration of the motor is generated, a vibration frequency of vibration torque may be a value determined according to a virtual engine speed, which is not a constant value.

For example, the vibration frequency may linearly change in proportion to a change in the virtual engine speed, and when the virtual engine speed is 1000 rpm, a vibration torque having a vibration frequency of 1000/60 Hz may not be desired.

However, if vibration torque of 10 Hz is applied when the virtual engine speed is 1000 rpm, it may be possible to apply vibration torque of 20 Hz when the virtual engine speed is 2000 rpm, which is a linear and proportional increase.

Needless to say, as described above, when a key-on/start-button-on signal and an on-signal of a virtualization function are input, the virtual-effect-providing controller 22 may virtualize an initial starting situation, whereby vibration of the motor, which is synchronized with a speed profile value of the virtual engine speed when the vehicle is turned on, may be realized.

In this case, a virtual vibration effect, obtained by realizing the situation in which an internal-combustion-engine vehicle is turned on, may be realized by controlling vibration of the motor according to a vibration torque profile for realizing the situation in which the vehicle is turned on, which is set separately from a vibration of the idle mode.

As described above, the vibration effect may be realized, and simultaneously, a sound having a pitch that corresponds to the virtual idle speed may be generated through a sound device.

As such, a virtual acoustic effect obtained by mimicking an engine sound in the engine idle state may be realized in the virtual idle state.

According to one form of the present disclosure, it is not desired to associate a frequency of a sound with a virtual engine speed value, and similar to the frequency of the vibration torque, the frequency of the sound may be linearly and proportionally changed with a change in the virtual engine speed.

Upon receiving a key-on/start-button-on signal and an on-signal of a virtualization function, the virtual-effect-providing controller 22 may be set to output and realize a sound that corresponds to a speed profile value of the virtual engine speed when the vehicle is turned on, as described above.

Virtual Throttling Mode

Then, according to one form of the present disclosure, vibration, a visual effect, and an acoustic effect obtained by mimicking the throttling state of an ICE (engine) vehicle may be realized in order to visually form a virtual throttling sensation in the state in which the vehicle is stopped (refer to FIG. 2).

The virtual throttling mode may be a mode for virtually realizing the situation in which a driver manipulates an accelerator pedal in the state in which a transmission of an internal-combustion-engine vehicle is in neutral (N).

In order to execute the virtual throttling mode, a virtual engine speed value for realizing a virtual throttling situation may be preset in the virtual-effect-providing controller 22.

In this case, the lower limit of the virtual engine speed value for realizing the virtual throttling situation may be determined as the aforementioned virtual idle speed.

The virtual engine speed value for realizing the virtual throttling situation may be set to a value corresponding to an accelerator pedal input value (APS value) of the driver, and as the accelerator pedal input value (APS value) increases, the virtual engine speed value may be set to further increase.

The virtual engine speed for realizing virtual throttling may be determined based on setting data that is pre-input and stored from the accelerator pedal input value (APS value) by the virtual-effect-providing controller 22, in which case the setting data may be a map, a mathematical expression, or the like.

For example, the virtual-effect-providing controller 22 may determine the virtual engine speed for virtual throttling in the state in which the vehicle is stopped from a map using the accelerator pedal input value (APS value) as an input parameter.

In addition, the virtual-effect-providing controller 22 may calculate the virtual engine speed for virtual throttling by multiplying the accelerator pedal input value (APS value) by a scaling factor.

Post-processing may be performed on the aforementioned determined virtual engine speed for virtual throttling, and may be, for example, a rate limit, filtering, or setting of an upper limit.

Here, the upper limit and the lower limit of the rate limit may be set as a function value of an input value of an accelerator pedal and a function value of a virtual engine speed.

During filtering, a low pass filter, a lead filter, or the like may be used, and the upper limit may be set by setting the maximum value of the virtual engine speed, and thus the virtual engine speed set to the upper limit may be a speed corresponding to a virtual red zone (refer to the "virtual red zone" of FIG. 2).

The virtual parameter, such as the virtual engine speed, may be set in the state in which the vehicle is stopped in which an actual motor speed detected by the motor speed detector is equal to or less than a preset threshold value or is 0 (zero), at which the stopped state is assumed, and a method of setting virtual engine speed when the actual motor speed is greater than the threshold value will be described below in more detail.

As described above, when the virtual engine speed for virtual throttling using the virtual idle speed as the lower limit is determined, the virtual-effect-providing controller 22 may control an operation of a display device of the vehicle, that is, a tachometer of the cluster 53 to display the determined virtual engine speed.

Needless to say, virtual engine speed for throttling in which a driver manipulates an accelerator pedal in the state in which the vehicle is stopped may be determined as a value based on the accelerator pedal input value (APS value) as described above, and whenever the driver manipulates the accelerator pedal using the virtual idle speed as the lowest value, the virtual engine speed value displayed on the cluster 53 may be increased.

However, in this case, the actual motor speed may be the speed in the stopped state like in the virtual idle state.

As described above, the virtual engine speed for throttling may be displayed in real time through the cluster 53, and simultaneously, the virtual-effect-providing controller 22 may realize a virtual vibration effect acquired by mimicking a vibration for actual throttling, to provide a virtual throttling sensation, as in the virtual idle state.

In this case, a similar vibration effect to the case of throttling in an actual ICE vehicle may be virtualized through vibration of the motor, and in this regard, the vibration torque of the vibration frequency determined by the virtual-effect-providing controller 22 may be applied to the motor 41.

That is, the virtual-effect-providing controller 22 may generate a motor torque command (an intervention torque command for realizing a virtual effect) for generating vibration in the motor 41 in order to virtualize the vibration effect for throttling, may control an operation of the motor 41 according to the generated motor torque command, and may generate a motor vibration, acquired by realizing the engine vibration for throttling in an internal-combustion-engine vehicle.

In this case, the motor may be vibrated by alternately outputting forward torque and backward torque with a predetermined period, which may be a motor control state in which the vehicle generates vibration at a level similar to the case of throttling of the actual ICE vehicle.

According to one form of the present disclosure, when the motor torque command for generating motor vibration is generated, the vibration frequency of the vibration torque may be a value determined according to a virtual engine speed, which is not a constant value, like in the virtual idle state, and for example, the vibration frequency may linearly and proportionally change depending on a change in the virtual engine speed.

When the virtual engine speed reaches a preset upper limit or an approximate level to the upper limit by a setting difference value or less, vibration torque for mimicking a virtual fuel cut may be applied to the motor 41.

Also, in the case of vibration for a virtual fuel cut, the virtual-effect-realizing controller 22 may generate a motor torque command for generating a vibration in the motor 41 in order to virtually form a vibration effect, may control the operation of the motor 41 according to the generated motor torque command, and may generate a motor vibration obtained by copying the engine vibration for fuel cut in the internal-combustion-engine vehicle (refer to FIG. 2).

In this case, the amplitude and the period of the vibration torque may be set to values different from those of the vibration torque in the virtual idle state.

As described above, the vibration effect may be realized, and simultaneously, a sound having a pitch that corresponds to the virtual idle speed for virtual throttling may be generated through a sound device.

As such, a virtual acoustic effect obtained by mimicking an engine sound in throttling in the internal-combustion-engine vehicle may be realized in the virtual throttling situation.

According to one form of the present disclosure, it is not desired to associate a frequency of sound with the virtual engine speed like the frequency of the vibration torque, but the frequency of the sound may be linearly and proportionally changed with virtual engine speed.

Launching Mode

A method of virtualizing the characteristics of an ICE vehicle according to the present disclosure may include an operation of realizing a virtual clutch slip effect by changing a virtual engine speed when a vehicle is launched.

Figure 3:
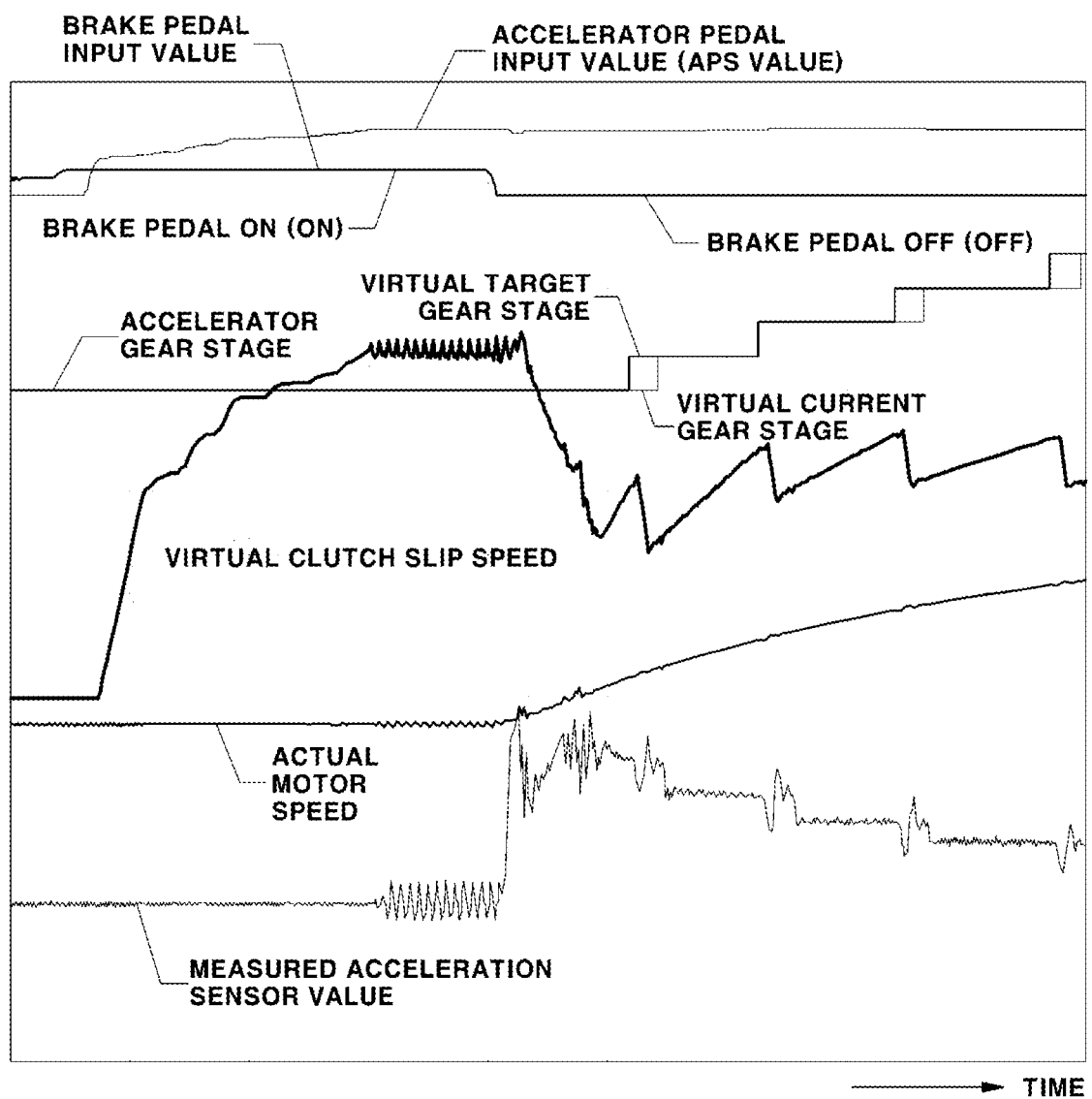
FIG. 3 is a diagram showing an example of virtual engine speed and vibration-realizing state when a virtual clutch slip effect in a launching mode and a virtual gear-shift effect in a driving mode are formed.

A launching mode will be described with reference to FIG. 3.

In an internal-combustion-engine vehicle, clutch slip may occur when a transmission is in a driving stage (D) and a driver simultaneously depresses a brake pedal and an accelerator pedal, and then when the driver takes their foot off the brake pedal, the vehicle may be launched.

The launching mode may be obtained by virtualization of the launch and clutch slip situation.

The aforementioned virtual idle or the feeling of virtual throttling may be formed when the actual motor speed detected by the motor speed detector is equal to or less than a predetermined threshold value or 0 (zero), corresponding to the stopped state, in which case the virtual engine speed may be determined depending on an accelerator pedal input value (APS value) from a driver.

On the other hand, when the actual motor speed is equal to or less than a threshold value or is 0 in brake pedal-on and accelerator pedal-on states, clutch slippage may occur, and then when the actual motor speed is greater than the threshold value, the vehicle may be launched, and the virtual engine speed in the launching mode including a clutch slip situation may be determined from the actual motor speed.

In detail, when the vehicle is launched, the virtual engine speed may be determined as a value obtained by multiplying a virtual gear ratio corresponding to the current virtual gear stage (virtual current gear stage) determined through the virtual transmission model by the actual motor speed.

However, in the case of clutch slip, which is the state in which a driver depresses both an accelerator pedal and a brake pedal, the actual motor speed may be equal to or less than a threshold value or 0, and in which case clutch slip occurs in an ICE driving system, and thus, according to the present disclosure, a virtual clutch slip effect of initial launch may be formed by copying the clutch slip.

While a virtual clutch slip effect is realized during vehicle launching, the virtual engine speed may be calculated based on the actual motor speed and the accelerator pedal input value (APS value), but not on the actual motor speed alone.

In this case, a value may be obtained by multiplying the actual motor speed by the virtual gear ratio corresponding to the virtual current gear stage, and thus the virtual engine speed may be calculated by further adding the virtual clutch slip speed.

Here, a virtual gear stage when the virtual clutch slip effect needs to be realized during vehicle launching may be stage 1, and thus the virtual gear ratio may be a gear ratio that is set when the virtual gear stage is stage 1.

A controller, that is, the virtual-effect-providing controller 22 of the first controller 20, may calculate the virtual clutch slip speed from the accelerator pedal input value (APS value), and in this case, the virtual clutch slip speed based on the accelerator pedal input value (APS value) may be calculated using a map, a mathematical expression, or an ICE driving system model.

For example, when the ICE driving system model is used, if virtual torque is calculated using a function of the accelerator pedal input value (APS value) in the model, the virtual clutch slip speed may be calculated using a function of the calculated virtual torque.

As such, the virtual engine speed during vehicle launching may be information obtained in real time from the motor speed, which is the actual driving system speed of an EV, and may be acquired in real time from the accelerator pedal input value (APS value) in addition to the actual motor speed while clutch slip occurs during vehicle launching.

In this case, the virtual engine speed obtained using the function of the actual motor speed, but not the virtual engine speed obtained using the function of the accelerator pedal input value (APS value), may have a discontinuous point, and in order to solve the problem, the virtual engine speed may be finally determined through post-processing, such as a preset rate limit or filtering.

When the threshold value with respect to the actual motor speed is set in the virtual-effect-providing controller 22, the threshold value may be a predetermined constant, but may also be set to a variable changed depending on a virtual engine speed determined using a function of the accelerator pedal input value (APS value).

The aforementioned calculated virtual engine speed during vehicle launching may include two components, namely ① a virtual engine speed that is changed depending on an actual motor speed, and ② a component that exceeds a virtual engine speed component, which is changed depending on the actual motor speed.

Here, the component that exceeds the virtual engine speed component may be referred to as a virtual clutch slip amount, and may correspond to the above virtual clutch slip speed.

The aforementioned post-processing, such as a rate limit and filtering, may be separately or selectively applied to ① and ② above.

Irrespective of whether the actual motor speed is equal to or less than the threshold value or is greater than the threshold value, when the virtual engine speed reaches a preset upper limit or a level approximate to the upper limit by a setting difference value or less, vibration torque for mimicking a virtual fuel cut may be applied to the motor.

As described in the method of forming a sensation during virtual throttling, the virtual-effect-providing controller 22 may form a vibration for virtual fuel cut by generating a motor torque command for generating vibration in the motor in order to virtualize a vibration effect, controlling an operation of the motor according to the generated motor torque command, and generating a motor vibration obtained by mimicking the engine vibration for fuel cut in the internal-combustion-engine vehicle.

In this case, the amplitude or the period of the vibration torque may be set to different values from the vibration torque in the virtual idle state, the virtual throttling state, or realization of the virtual clutch slip effect.

As described above, when the final virtual engine speed for realizing virtual clutch slip is determined, the virtual-effect-providing controller 22 may control an operation of a display device of the vehicle, that is, a tachometer of the cluster 53 to visually display the determined virtual engine speed in real time.

Simultaneously, the virtual-effect-providing controller 22 may realize a virtual vibration effect obtained by mimicking a vibration during vehicle launching and clutch slip.

In this case, a vibration effect similar to the case of actual clutch slippage may be virtualized through motor vibration, in which case the vibration torque of the vibration frequency determined by the virtual-effect-providing controller 22 may be applied to the motor.

That is, the virtual-effect-providing controller 22 may generate a motor torque command for generating vibration in the motor in order to virtualize the vibration effect during virtual clutch slip, may control an operation of the motor according to the generated motor torque command, and may generate motor vibration acquired by realizing vibration during clutch slip in the internal-combustion-engine vehicle.

In this case, the motor may be vibrated by alternately outputting forward torque and backward torque with a predetermined period, which may be a motor control state in which the vehicle generates vibration at a level similar to the case of clutch slip.

When the motor torque command for generating motor vibration is generated, if the virtual clutch slip effect is realized, the vibration frequency of the vibration torque may also be linearly and proportionally changed according to change in virtual engine speed, as in virtual throttling.

In addition, when the vibration effect is realized, and simultaneously, the virtual clutch slip effect is realized, the virtual-effect-providing controller 22 may also generate a sound having a pitch that corresponds to the virtual idle speed through a sound device, as in the case of virtual throttling.

Then, a method of virtualization of the characteristics of an internal-combustion-engine (ICE) vehicle according to the present disclosure may include an operation of realizing vibration and an acoustic effect obtained by mimicking an ICE driving system by controlling motor torque during vehicle traveling.

A controller, that is, the virtual-effect-providing controller 22 of the first controller may calculate the virtual engine speed in real time using the same method as in the case in which the clutch slip effect is realized during vehicle driving in which the actual motor speed is greater than the threshold value.

In this case, the virtual engine speed may be determined based on the actual motor speed detected by the motor speed detector, and in detail, may be determined as a value obtained by multiplying a virtual gear ratio corresponding to the current virtual gear stage by the actual motor speed.

When the final virtual engine speed is determined through post-processing in the same way as in the case in which the aforementioned virtual clutch slip effect is realized, the virtual-effect-providing controller 22 may control an operation of a display device of the vehicle, that is, a tachometer of the cluster 53 to display the determined virtual engine speed in real time.

Simultaneously, a controller, that is, the virtual-effect-providing controller 22 of the first controller may determine an intervention torque command for realizing a virtual effect for mimicking a characteristic vibration of the ICE driving system, which occurs in a vehicle including an engine, a transmission, and a clutch installed therein while the vehicle travels.

Then, the controller may determine and generate the final motor torque command using a method of adding the determined intervention torque command for realizing a virtual effect to a motor torque command (basic torque command) for controlling a general motor.

As a result, the controller controls an operation of the motor according to the final motor torque command, and thus the feeling of the ICE driving system may be virtualized while an electric vehicle travels.

The characteristic vibration may include all of clutch stick-slip vibration, a virtual gear-shift effect, an acceleration effect generated when boost of a turbo charger is increased, and vibration generated due to distortion of a rotation axis of a transmission, in addition to the aforementioned idle vibration.

A controller, that is, the virtual-effect-providing controller 22 of the first controller 20 may adjust a pitch, a volume, an equalizer, or the like of a sound using the final motor torque command or the actually measured actual motor torque, basic torque command, and an intervention torque command for realizing a virtual effect, or a value obtained by post-processing the same, a value calculated based on one or two or more among the same, or a value obtained from a selective combination of the same.

For example, when the intervention torque command for realizing a virtual effect is not applied, a sound pitch of a virtual engine sound may be further increased compared with the case in which the intervention torque command for realizing a virtual effect is applied.

The volume of the virtual engine sound may be further increased as the final motor torque command or the actual motor torque is increased.

As a basic torque command value is reduced, a gain in a low sound range of an engine sound may be changed to a greater value, or as the basic torque command value is increased, a gain in a high sound range of an engine sound may be changed to a greater value.

When an acoustic effect is realized, various sound pitches may be mixed, and the range in which the sound pitches are mixed may be adjusted depending on a variation per hour of one of the aforementioned torque commands.

Figure 4:
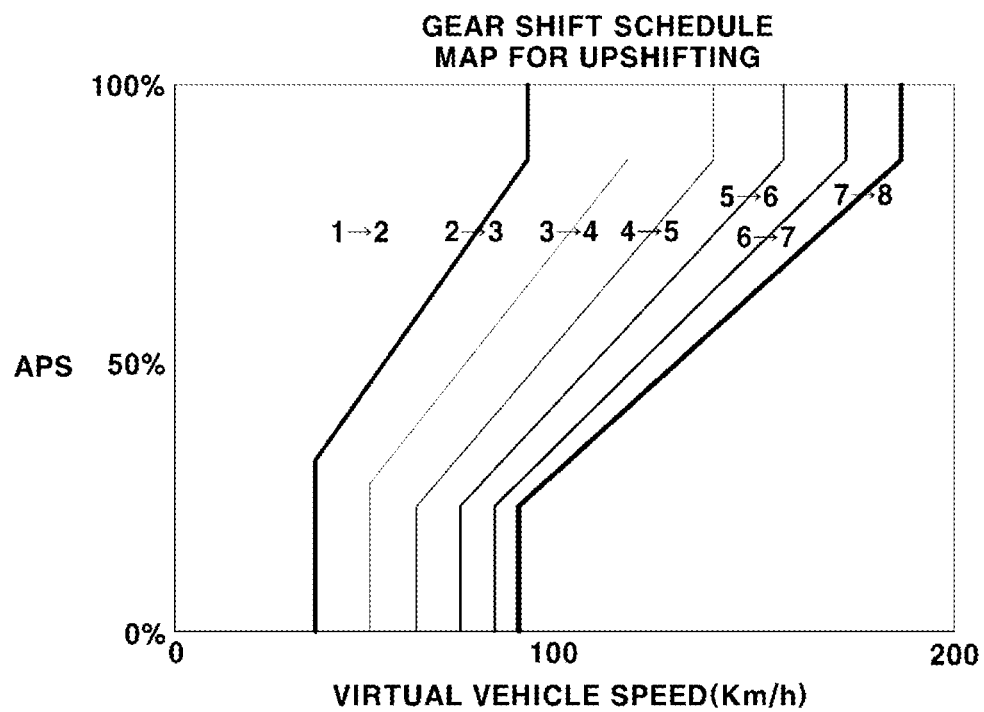
FIG. 4 is a diagram showing an example of a gear shift schedule map used to form a virtual gear-shift effect.
Figure 4:
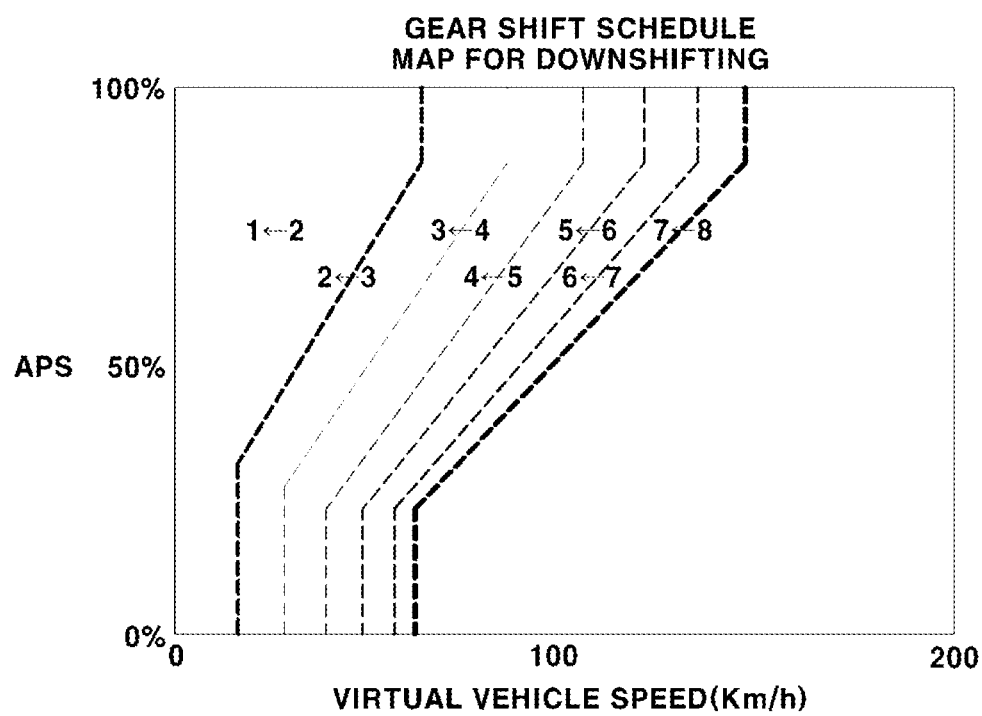

FIG. 4 illustrates that a virtual gear shift (VGS) function, that is, a function of forming a virtual gear-shift effect in a driving mode after a vehicle is launched may be executed, and illustrates an example of a virtual current gear stage and a virtual target gear stage when a virtual gear-shift effect is formed.

Here, an operation of forming a virtual gear-shift effect will be described below.

The virtual gear-shift effect may be formed by mimicking a vehicle behavior and motion that a driver experiences during gear shift of a multi-step transmission, and during the operation of forming the virtual gear-shift effect, the virtual gear-shift effect may be generated and formed by controlling a motor (a driving motor).

In order to form the virtual gear-shift effect, an ICE driving system model, obtained by mimicking an ICE, a transmission, or the like, may be set in the virtual-effect-providing controller 22, virtual gear shift torque intervention may be performed as a gear shift event occurs in the virtual transmission model of the ICE driving system model, and in this case, the virtual gear shift intervention torque (which is intervention torque for realizing a virtual effect during virtual gear shifting) may be realized in the form of a motor torque command.

That is, a virtual gear-shift effect may be generated and formed by controlling motor torque when a gear shift event occurs, and a motor torque command may be corrected in order to generate and form a virtual gear-shift effect, and in this case, correction torque for correcting the motor torque command may be virtual gear shift intervention torque.

In a control procedure for generating a virtual gear-shift effect of an electric vehicle, a controller (which may be a virtual effect realizing controller) may determine whether a gear shift event occurs from virtual vehicle speed and an accelerator pedal input value (APS value) (or a vehicle load) using a preset gear shift schedule map, and may determine a virtual target gear stage.

Here, the virtual vehicle speed may be determined as a value that is in direct proportion to the actual motor speed using the actual motor speed and a virtual final reduction gear ratio, and the virtual final reduction gear ratio may be a preset value in the virtual-effect-providing controller 22.

The controller may determine a virtual current gear stage and may determine a gear shift class from the determined virtual target gear stage, and may select a virtual gear shift intervention torque profile corresponding to the determined current gear shift class among the preset virtual gear shift intervention torque profiles for respective preset gear shift classes.

Here, the virtual gear shift intervention torque profile may be a torque profile having a preset virtual gear shift intervention torque value depending on a gear shift progress rate, and the gear shift progress rate may be determined as, for example, a percentage (%) of a counted time with respect to a total preset gear-shifting time, and may increase until reaching 100%.

The gear shift class may be classified into power-on upshift, power-off upshift (lift-foot-up), power-on downshift (kick-down), power-off downshift, near-stop downshift, and the like.

In order to calculate the virtual gear shift intervention torque, the controller may determine the current gear shift class, and in this case, the determination method may be upshifting when the virtual target gear stage is higher than the virtual current gear stage (i.e., virtual target gear stage>virtual current gear stage), and in contrast, the determination method may be downshifting when the virtual target gear stage is lower than the virtual current gear stage (i.e., virtual target gear stage<virtual current gear stage).

In addition, when the basic torque command (motor torque command) is greater than a preset reference torque value, the determination method may be power-on, and when the basic torque command (motor torque command) is smaller than the preset reference torque value, the determination method may be power-off.

FIG. 4 is a diagram showing an example of a gear shift schedule map used to form a virtual gear-shift effect according to one form of the present disclosure and illustrates an example of a gear shift schedule map for upshifting and a gear shift schedule map for downshifting.

Then, the controller may determine the virtual gear shift intervention torque for generating a virtual gear-shift effect in real time according to the selected virtual gear shift intervention torque profile, and may determine the final motor torque command by correcting the motor torque command (basic torque command) using the virtual gear shift intervention torque.

In this case, the torque may be corrected using a method of adding the virtual gear shift intervention torque to the motor torque command.

As described above, when the final motor torque command is generated, the controller may control an operation of the motor for driving the vehicle according to the generated final motor torque command to generate the virtual gear-shift effect by the motor.

When the virtual gear shift intervention torque is determined, that is, whenever a gear shift event occurs, the motor torque command may be corrected using the determined virtual gear shift intervention torque, and the virtual gear-shift effect may be generated by controlling an operation of the motor according to the corrected motor torque command.

The control procedure for generating and forming a virtual gear-shift effect has been described above, and the virtual-effect-providing controller 22 may determine virtual engine speed as a value obtained by multiplying a virtual gear ratio of the virtual current gear stage, determined by a virtual transmission model, by an actual motor speed while the vehicle travels, and may control a tachometer of the cluster 53 to display the determined virtual engine speed and a number of virtual current gear stages in real time.

Thus, the apparatus and method for virtualization of the characteristics of an ICE vehicle in an electric vehicle according to the present disclosure may virtualize the characteristics of an ICE driving system in an electric vehicle without an ICE (engine), a transmission, and a clutch and may provide the driver in the electric vehicle with an operating effect and a driving effect as if an ICE, a transmission, and a clutch were actually operated.

In addition, the driver may experience a driving sensation along with interest, excitement, a feeling of direct connection, or the like, provided by the ICE driving system in his or her vehicle without changing a vehicle.

The present disclosure has been described in detail with reference to various forms thereof. However, it will be appreciated by those skilled in the art that changes may be made in these forms without departing from the principles and spirit of the present disclosure, the scope of which is defined in the appended claims and their equivalents.

What is claimed is:

1. A method of virtualization of characteristics of an internal-combustion-engine vehicle in an electric vehicle, the method comprising:
   receiving, at a controller, vehicle driving information related to the electric vehicle;
   determining, by the controller, a current vehicle driving mode based on the vehicle driving information, wherein the current vehicle driving mode comprises at least one of an idle mode, a throttling mode, a launching mode, or a driving mode;
   determining, by the controller, a virtual engine speed for the current vehicle driving mode;
   outputting, by the controller, a control signal for virtualizing characteristics of an internal-combustion-engine (ICE) driving system corresponding to the current vehicle driving mode; and
   virtualizing, by the controller, the characteristics of the ICE driving system corresponding to the current vehicle driving mode by controlling an operation of a virtualization device according to the control signal output from the controller, wherein the virtual engine speed corresponding to a virtual clutch slip state is determined as a value obtained by adding a virtual clutch slip speed, determined based on a detected accelerator pedal input value, to a value obtained by multiplying a detected speed of a driving motor and a preset virtual gear ratio.

2. The method of claim 1, wherein the vehicle driving information comprises at least one of:
   the accelerator pedal input value detected by an accelerator pedal detector;
   a brake pedal input value detected by a brake pedal detector; or
   the speed of the driving motor, detected by a motor speed detector.

3. The method of claim 2, wherein determining the virtual engine speed comprises:
   when the current vehicle driving mode is determined as the idle mode in a state in which the vehicle is stopped, determining, by the controller, a preset virtual idle speed as the virtual engine speed.

4. The method of claim 3, wherein determining the virtual engine speed comprises:
   in a key-on situation in which a vehicle key-on signal is input,
   determining, by the controller, the virtual engine speed according to a virtual engine speed profile that is set to change to the preset virtual idle speed from 0 (zero).

5. The method of claim 2, wherein determining the virtual engine speed comprises:
   when the current vehicle driving mode is determined as the throttling mode in a state in which the electric vehicle is stopped, determining, by the controller, the virtual engine speed according to the accelerator pedal input value of the vehicle driving information.

6. The method of claim 2, wherein determining the virtual engine speed comprises:
   when the current vehicle driving mode is determined as the launching mode, and it is determined that a driver is simultaneously manipulating a brake pedal and an accelerator pedal based on the accelerator pedal input value and the brake pedal input value, determining, by the controller, the virtual engine speed corresponding to a virtual clutch slip state.

7. The method of claim 6, wherein the virtual engine speed corresponding to the virtual clutch slip state is determined based on:
   the speed of the driving motor detected by the motor speed detector;
   the preset virtual gear ratio; and
   the accelerator pedal input value detected by the accelerator pedal detector.

8. The method of claim 6, wherein, when the brake pedal is released by the driver in the virtual clutch slip state of the launching mode, the controller is configured to determine the virtual engine speed based on the speed of the driving motor and a virtual gear ratio corresponding to a current gear stage determined by a virtual transmission model based on the vehicle driving information.

9. The method of claim 2, wherein determining the virtual engine speed comprises:
when the current vehicle driving mode is determined as the driving mode, determining, by the controller, the virtual engine speed from the detected speed of the driving motor and a virtual gear ratio corresponding to a current virtual gear ratio determined by a virtual transmission model based on the vehicle driving information.

10. The method of claim 9, wherein when the current vehicle driving mode is determined as the driving mode, the controller is configured to determine a value obtained by multiplying the detected speed of the driving motor with the virtual gear ratio corresponding to a current virtual gear stage.

11. The method of claim 9, wherein:
the virtualization device is a driving motor of the vehicle configured to output vibration torque obtained by mimicking a vibration of the ICE driving system according to the control signal of the controller,
the controller is configured to determine the current vehicle driving mode as one of the throttling mode, the launching mode, and the driving mode, and
when the virtual engine speed reaches a preset upper limit or a value equal to or less than the preset upper limit by a setting difference value, the controller is configured to output the control signal for controlling the driving motor and to realize virtual fuel cut vibration to output a preset vibration torque corresponding to a virtual fuel cut.

12. The method of claim 1, wherein:
the virtualization device is a driving motor of the vehicle configured to output vibration torque obtained by mimicking a vibration of the ICE driving system according to the control signal of the controller, and
the controller is configured to determine and use a vibration frequency of vibration torque that is changed according to an engine virtual speed, and to output a control signal for outputting the vibration torque of the vibration frequency.

13. The method of claim 1, wherein:
the virtualization device is a sound device of the vehicle configured to output a sound obtained by mimicking a sound generated by the ICE driving system according to the control signal of the controller, and
the controller is configured to determine and use one or two of a frequency and a pitch of a sound that corresponds to engine virtual speed, and to output a control signal for outputting a sound of one or two of the frequency and the pitch.

14. An apparatus for virtualizing characteristics of an internal-combustion-engine vehicle in an electric vehicle, the apparatus comprising:
a driving information detector configured to detect vehicle driving information in the electric vehicle;
a controller configured to:
receive the vehicle driving information detected by the driving information detector,
determine a current vehicle driving mode based on the vehicle driving information, wherein the current vehicle driving mode comprises at least one of an idle mode, a throttling mode, a launching mode, or a driving mode,
determine a virtual engine speed in the current vehicle driving mode, and
output a control signal for virtualizing characteristics of an internal-combustion-engine (ICE) driving system corresponding to the current vehicle driving mode based on the virtual engine speed; and
a virtualization device configured to virtualize the characteristics of the ICE driving system corresponding to the current vehicle driving mode by controlling an operation of the virtualization device according to the control signal output by the controller, wherein the virtual engine speed corresponding to a virtual clutch slip state is determined as a value obtained by adding a virtual clutch slip speed, determined based on a detected accelerator pedal input value, to a value obtained by multiplying a detected speed of a driving motor and a preset virtual gear ratio.

15. The apparatus of claim 14, wherein the driving information detector comprises at least one of:
an accelerator pedal detector configured to detect the accelerator pedal input value of a driver;
a brake pedal detector configured to detect a brake pedal input value of the driver; or
a motor speed detector configured to detect the speed of the driving motor for driving the vehicle.

16. The apparatus of claim 14, wherein:
the virtualization device is a driving motor of the vehicle configured to output a vibration torque obtained by mimicking a vibration of the ICE driving system according to the control signal of the controller, and
the controller is configured to determine and use a vibration frequency of a vibration torque, which is changed according to an engine virtual speed, and to output a control signal for outputting the vibration torque of the vibration frequency.

17. The apparatus of claim 14, wherein:
the virtualization device is a sound device of the vehicle configured to output a sound obtained by mimicking a sound generated by the ICE driving system according to the control signal of the controller, and
the controller is configured to determine and use one or two of a frequency and a pitch of a sound that corresponds to engine virtual speed, and to output a control signal for outputting a sound of one or two of the frequency and the pitch.

18. The apparatus of claim 14, wherein the virtualization device is a display device configured to display the virtual engine speed.

* * * * *